(12) United States Patent
Johnson et al.

(10) Patent No.: US 10,931,157 B2
(45) Date of Patent: Feb. 23, 2021

(54) UNITARY STRUCTURE HAVING MAGNETIC AND NON-MAGNETIC PHASES

(71) Applicant: GENERAL ELECTRIC COMPANY, Schenectady, NY (US)

(72) Inventors: Francis Johnson, Clifton Park, NY (US); Mohamed Osama, Bayern (DE); Francesco Papini, Como (IT)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 15/972,894

(22) Filed: May 7, 2018

(65) Prior Publication Data
US 2019/0341821 A1 Nov. 7, 2019

(51) Int. Cl.
| H02K 1/02 | (2006.01) |
| H02K 1/27 | (2006.01) |
| H02K 1/14 | (2006.01) |
| H02K 15/03 | (2006.01) |
| H02K 15/12 | (2006.01) |

(52) U.S. Cl.
CPC ........... *H02K 1/2793* (2013.01); *H02K 1/145* (2013.01); *H02K 15/03* (2013.01); *H02K 15/12* (2013.01); *H02K 2201/12* (2013.01)

(58) Field of Classification Search
CPC .... H02K 1/182; H02K 1/2793; H02K 21/026; H02K 21/24; H02K 1/145; H02K 15/03; H02K 15/12; H02K 2201/12
See application file for complete search history.

(56) References Cited

U.S. PATENT DOCUMENTS

| 3,948,690 A * | 4/1976 | Pavlik | H01F 1/24 148/105 |
| 7,846,271 B2 | 12/2010 | Choi et al. | |
| 8,053,944 B2 | 11/2011 | Calley et al. | |
| 9,634,549 B2 | 4/2017 | Dial et al. | |
| 2016/0126794 A1 | 5/2016 | Gery et al. | |
| 2016/0203898 A1* | 7/2016 | Johnson | C22C 38/04 335/302 |
| 2017/0053729 A1* | 2/2017 | Kotani | H01F 1/24 |

(Continued)

FOREIGN PATENT DOCUMENTS

JP 2013013304 A 1/2013

OTHER PUBLICATIONS

Garibaldi et al., "The Impact of Additive Manufacturing on the Development of Electrical Machines for MEA Applications: A Feasibility Study", Hal Archives Ouvertes, Jul. 19, 2015, pp. 1-6.

(Continued)

*Primary Examiner* — Thomas Truong
(74) *Attorney, Agent, or Firm* — Wood IP LLC

(57) ABSTRACT

A magnetic component having a unitary structure, a transverse flux electric machine having the magnetic component, and a method of making the magnetic component are disclosed. The unitary structure of the magnetic component includes a magnetic region and a non-magnetic region. The magnetic region includes a magnetic phase and an electrically insulating phase. The non-magnetic region includes a non-magnetic phase. The magnetic phase includes a metallic material and the non-magnetic phase includes a nitrogenated metallic material formed by a controlled nitrogenation of the metallic material.

17 Claims, 4 Drawing Sheets

(56) References Cited

U.S. PATENT DOCUMENTS

| | | |
|---|---|---|
| 2017/0063183 A1 | 3/2017 | Shrestha et al. |
| 2017/0155309 A1 | 6/2017 | Jassal et al. |
| 2017/0183764 A1 | 6/2017 | Dial |
| 2018/0175678 A1* | 6/2018 | Papini .................. H02K 21/125 |

OTHER PUBLICATIONS

Hieke et al., "Two-Phase Transverse Flux Machine with disc Rotor for High Torque low Speed Application", Power Electronics and Applications (EPE'17 ECCE Europe), Sep. 2017, pp. 1-8.

Stautner et al., "Thermal Interposer for a Cryogenic Cooling System",Pending U.S. Appl. No. 15/915,015, filed Mar. 7, 2018; 32 Pages.

* cited by examiner

UNITARY STRUCTURE HAVING MAGNETIC AND NON-MAGNETIC PHASES

STATEMENT REGARDING FEDERALLY SPONSORED RESEARCH & DEVELOPMENT

This invention was made with Government support under contract number DE-EE0007755, awarded by the United States Department of Energy. The Government has certain rights in the invention.

BACKGROUND

Embodiments of the present specification relate generally to a magnetic component having a unitary structure and a method of forming the same. More particularly, the embodiments relate to a magnetic component having a unitary structure of a magnetic region and a non-magnetic region, and method of forming the magnetic component.

Need for high power density and high efficiency electrical machines (i.e., electric motors and generators) has long been prevalent for a variety of applications, particularly for hybrid and/or electric vehicle traction applications. Currently, in hybrid/electric vehicle traction motor applications, rotational speed of the rotor is increased to increase a power density of an electrical machine. Increased power density results in reduced mass and cost. However, it is recognized that when electrical machines are used for traction applications in hybrid/electric vehicles, there is a clear tradeoff between power density, efficiency, and the machine's constant power speed range. This tradeoff presents numerous design challenges.

Dual phase soft magnetic materials are materials that have ability to be locally transformed from a ferromagnetic phase into a non-ferromagnetic (paramagnetic) phase that have a magnetic permeability near unity. This functionality enables machine designers to have improved control of the magnetic flux linkages between the magnetic poles of the rotor and stator in an electrical machine. This is beneficial in terms of power output and efficiency of the machines as compared to machines manufactured with conventional soft magnetic materials such as silicon steel.

Conventionally, the dual phase soft magnetic materials are manufactured as a rolled sheet that is formed into thin laminates used for subsequent assembly into an electric machine. Thus, the magnetic flux paths in the laminates are two-dimensional, and confined to the plane of the laminate. A portion of the magnetic flux path that is not confined to the plane of the laminate would result in unacceptably large eddy current losses in the laminates. Further, the portion of the magnetic flux path that is not confined to the plane of the laminate may be routed through airgap present between laminates, the need for the magnetic flux to cross the airgap defined by the laminates would increase the reluctance of the magnetic circuit that drives the machine. Hence, a larger current would be needed in the stator windings that would also lead to unacceptably large resistive losses in the stator windings. Embodiments of the present specification address these and other needs.

BRIEF DESCRIPTION

In accordance with one aspect of the specification, a magnetic component having a unitary structure is disclosed. The unitary structure of the magnetic component includes a magnetic region and a non-magnetic region. The magnetic region includes a magnetic phase and an electrically insulating phase. The non-magnetic region includes a non-magnetic phase. The magnetic phase includes a metallic material and the non-magnetic phase includes a nitrogenated metallic material formed by controlled nitrogenation of the metallic material.

In accordance with another aspect of the specification, a transverse flux electric machine is disclosed. The transverse flux electric machine includes a stator pole configured to transfer magnetic, flux in an axially skewed direction around a stator coil. The stator pole has a unitary structure. The unitary structure of the magnetic component includes a magnetic region and a non-magnetic region. The magnetic region includes a magnetic phase and an electrically insulating phase. The non-magnetic region includes a non-magnetic phase. The magnetic phase includes a metallic material and the non-magnetic phase includes a nitrogenated metallic material formed by a controlled nitrogenation of the metallic material.

In accordance with another aspect of the specification, a method of making a magnetic component is disclosed. The method includes performing an additive manufacturing technique using a metallic material to form the magnetic component that has a unitary structure having a metallic material in a magnetic state. A controlled nitrogenation of a selected region of the unitary structure is performed to transform the metallic material in the selected region into a nitrogenated metallic material, such that the unitary structure includes a magnetic region and a non-magnetic region. The magnetic region includes a magnetic phase and an electrically insulating phase. The non-magnetic region includes a non-magnetic phase. The magnetic phase includes the metallic material and the non-magnetic phase includes the nitrogenated metallic material.

BRIEF DESCRIPTION OF THE DRAWINGS

These and other features, aspects, and advantages of the present specification will become better understood when the following detailed description is read with reference to the accompanying drawings in which like characters represent like parts throughout the drawings.

DETAILED DESCRIPTION

Figure 1:
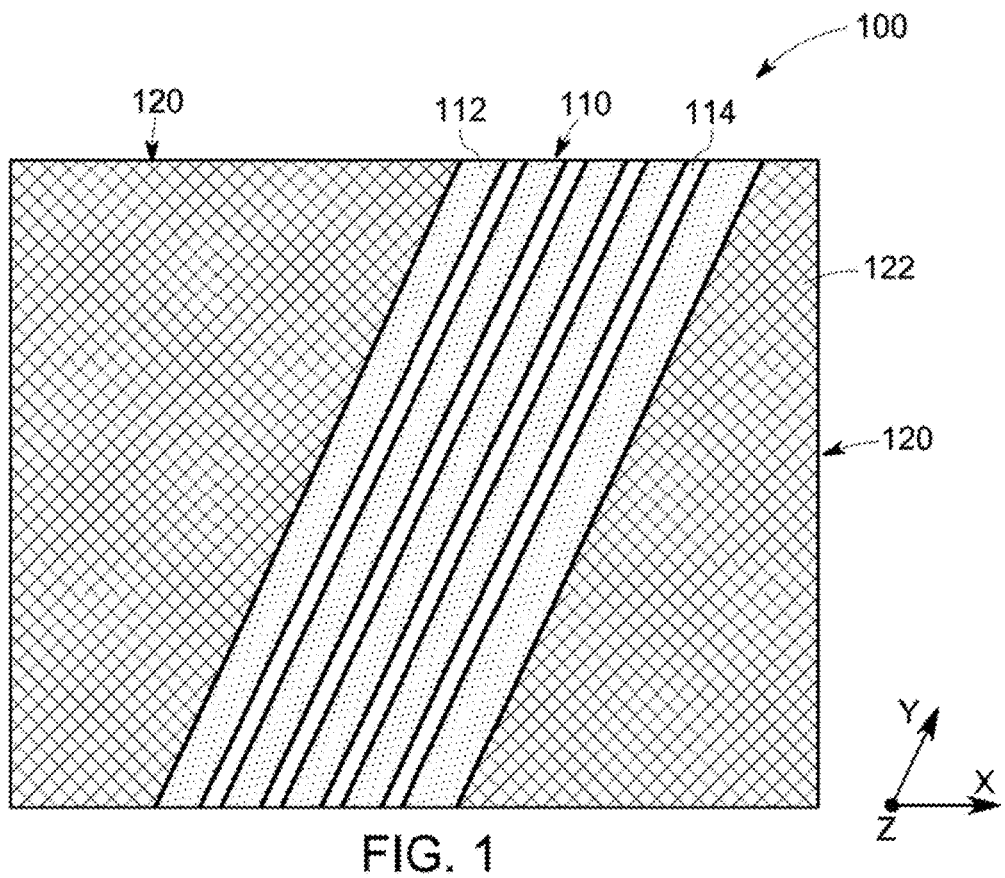
FIG. 1 illustrates a cross-sectional view of a magnetic component having a unitary structure and having magnetic and non-magnetic regions, according to some aspects of the present specification.

Different embodiments of the present specification relate to a magnetic component, a unitary structure of the magnetic component, and a method of forming the magnetic component.

When introducing elements of various embodiments of the present specification, the articles "a," "an," "the," and "said" are intended to mean that there are one or more of the elements. The terms "comprising" "including," and "having" are intended to be inclusive and mean that there may be additional elements other than the listed elements. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be, applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. As used herein, the term "or" is not meant to be exclusive and refers to at least one of the referenced components being present and includes instances in which a combination of the referenced components may be present, unless the context clearly dictates otherwise.

The present specification provides a magnetic component. The magnetic component has a unitary structure having magnetic and non-magnetic regions, where the magnetic region includes a magnetic phase and an electrically insulating phase, and the non-magnetic region includes a non-magnetic phase. The magnetic phase includes a metallic material. The non-magnetic phase includes a nitrogenated metallic material. The nitrogenated metallic material is formed by controlled nitrogenation of the metallic material of the magnetic phase.

To more clearly and concisely describe and point out the subject matter, the following definitions are provided for specific terms, which are used throughout the following description and the appended claims, unless specifically denoted otherwise with respect to particular embodiments.

As used herein, a "unitary structure" refers to a monolithic structure that does not have any joined parts or layers, after the formation of the structure. The unitary structure may have connected regions as a part of the structure, wherein the connections are established during the formation of the unitary structure itself. The unitary structure is not formed by mechanically, thermally, or chemically joining different substructures together, after the substructures are formed separately. The term "magnetic region" as used herein refers to a region of the magnetic component that has a ferromagnetic property. In particular, the magnetic region of the magnetic component allows flow of magnetic flux. The non-magnetic region in the magnetic component is configured to reduce or prevent flow of the magnetic flux. The term "magnetic phase" refers to a material in a magnetic state having a relative permeability greater than 1. In particular, a material having a relative permeability greater than 1 allows flow of magnetic flux, and is referred to as a magnetic phase. In some embodiments, the relative permeability of the magnetic phase of the magnetic region of the magnetic component is greater than 100, and a saturation magnetization is greater than 1.5 Tesla. A "non-magnetic phase" refers to a phase that has greater than about 90 volume % of the material in which the permeability is approximately 1, and the saturation magnetization is about zero. The non-magnetic region is a region that is configured not to facilitate flow of the magnetic flux. In certain embodiments, a "magnetic component" may be a magnetic part of any product, such as for example, a portion of a stator or rotor of a motor.

As used herein, a "metallic material" refers to a material that includes at least one metallic and electrically conducting element. In some embodiments, the metallic material is composed of a metal or alloy. In some embodiments, the metallic material is an alloy that includes one or more interstitial elements. By way of example, the metallic materials may be made of conventional materials, such as iron-based materials, nickel based materials or cobalt based materials, having dual magnetic properties to facilitate desirable functionalities of a core of a transverse flux machine.

FIG. 1 depicts a cross-sectional view of a magnetic component 100, in accordance with embodiments of the present specification. The magnetic component 100 includes a magnetic region 110 and a non-magnetic region 120. The magnetic region 110 includes a magnetic phase 112 and an electrically insulating phase 114. The non-magnetic region 120 includes a non-magnetic phase 122. Although not illustrated, the non-magnetic region 120 may also include an electrically insulating phase. In some embodiments, the unitary structure of the magnetic component 100 includes magnetic and non-magnetic regions 110 and 120, respectively. The magnetic and non-magnetic regions 110 and 120 may be dispersed in the magnetic component 100 such that the magnetic and non-magnetic regions 110 and 120 are adjacently disposed to one another in the unitary structure of the magnetic component 100. A magnetic region 110 may be in physical contact with other magnetic regions 110, non-magnetic regions 120, or both. In some embodiments, the magnetic region 110 is formed of a magnetic phase 112 and an electrically insulating phase 114 that is dispersed within the magnetic region 110. In some embodiments, a plurality of magnetic phases 112 and a plurality of electrically insulating phases 114 are randomly distributed in the magnetic region 110. The co-existence of the plurality of magnetic phases 112 and the plurality of electrically insulating phases 114 enables presence of the electrically insulating phase 114 in the vicinity of one or more magnetic phases 112 and limits generation of eddy current by the magnetic phase 112, during operation of the magnetic component 100.

The magnetic phase 112 includes a metallic material. The metallic material may be chosen such that magnetic permeability of the metallic material is high, and therefore, a high magnetic flux can be passed through the magnetic phase 112 in the magnetic region 110 when the magnetic component 100 is in operation. In some embodiments, the magnetic phase is made of a metallic material. Non-limiting examples of the metallic material includes iron, nickel, chromium, an alloy including any of the elements of iron, nickel, and chromium, or combinations of any of these elements to conduct magnetic flux during operation of the magnetic component 100. In some embodiments, the magnetic phase 112 may include an iron-nickel-chromium alloy in an amount greater than 90 weight percentage of the magnetic phase 112. In a specific embodiment, a Fe-20Cr-5Mn (in weight %) alloy is used as the metallic material.

The unitary structure of the magnetic component 100 is particularly advantageous in reducing loss of the magnetic flux during operation of the magnetic component 100. For example, in embodiments where the magnetic region 110 includes multiple layers, such as laminations, in the direction of flow of the magnetic flux through the magnetic region, boundaries of the individual layers may provide resistance to the magnetic flux lines traversing between two individual layers and some part of the magnetic flux may be lost by energy dissipation. Conversely, the unitary structure of the magnetic region 110 may not present any detectable resistance to the magnetic flux within the magnetic region 110 and hence aid in maximizing flow of the magnetic flux, resulting in enhanced efficiency of the magnetic component 100.

The non-magnetic region 120 of the magnetic component 100 aids in increasing, the mechanical strength of the magnetic component 100 and in further decreasing, the eddy current loss from the magnetic component 100. The unitary structure having both the magnetic region 110 and the non-magnetic region 120 of the magnetic component 100 aids in enhancing the mechanical integrity and strength of the magnetic component 100.

The non-magnetic region 120 includes a material having a non-magnetic phase. In embodiments presented herein, the magnetic phase 112 and the non-magnetic phase 122 of the unitary structure are formed by the same metallic material. To that end, the material of the non-magnetic phase 122 is a nitrogenated metallic material formed by controlled nitrogenation of the metallic material. Controlled nitrogenation of the metallic material transforms the metallic material from a magnetic state to a non-magnetic state. The nitrogenated metallic material of the non-magnetic phase 122 of the non-magnetic region 120 has a nitrogen content that is higher than a nitrogen content, if any, of the magnetic phase 112. In some embodiments, the non-magnetic phase 122 of the magnetic component 100 includes a nitrogen content that is greater than 0.1 weight percentage of the total weight of the nitrogenated metallic material of the magnetic phase 122. In some embodiments, the transformation of the metallic material from the magnetic phase 112 to the non-magnetic phase 122 is carried out in situ during the manufacturing of the unitary structure, and in some other embodiments, the transformation is carried out after the formation of the unitary structure.

The electrically insulating phase 114 may include a material that has a high electrical resistance to avoid or reduce any eddy current generation and conduction from the magnetic phase 112. A magnetic phase 112 without any interfacial electrically insulating phase typically generate higher amount of eddy current especially at high frequency operations of the magnetic component 100. High eddy current generation may increase energy loss from the magnetic component 100. Presence of electrically insulating phase 114 in the magnetic region 110 prevents, or at least reduces, the eddy current generation. In some embodiments, the electrically insulating material of the electrically insulating phase 114 may include air, an inert gas, an electrically insulating solid material, or any combinations thereof. In some embodiments, air, an inert gas, or a combination of the air and inert gas is disposed in one or more gaps in the magnetic phase 112, in a plane substantially parallel to a magnetic flux during an operation of the magnetic component 100. Non-limiting examples of the electrically insulating solid material includes polymers, ceramic materials, or combinations thereof. In some embodiments, particles of the metallic material are bonded to each other by the electrically insulating solid material.

Figure 2:
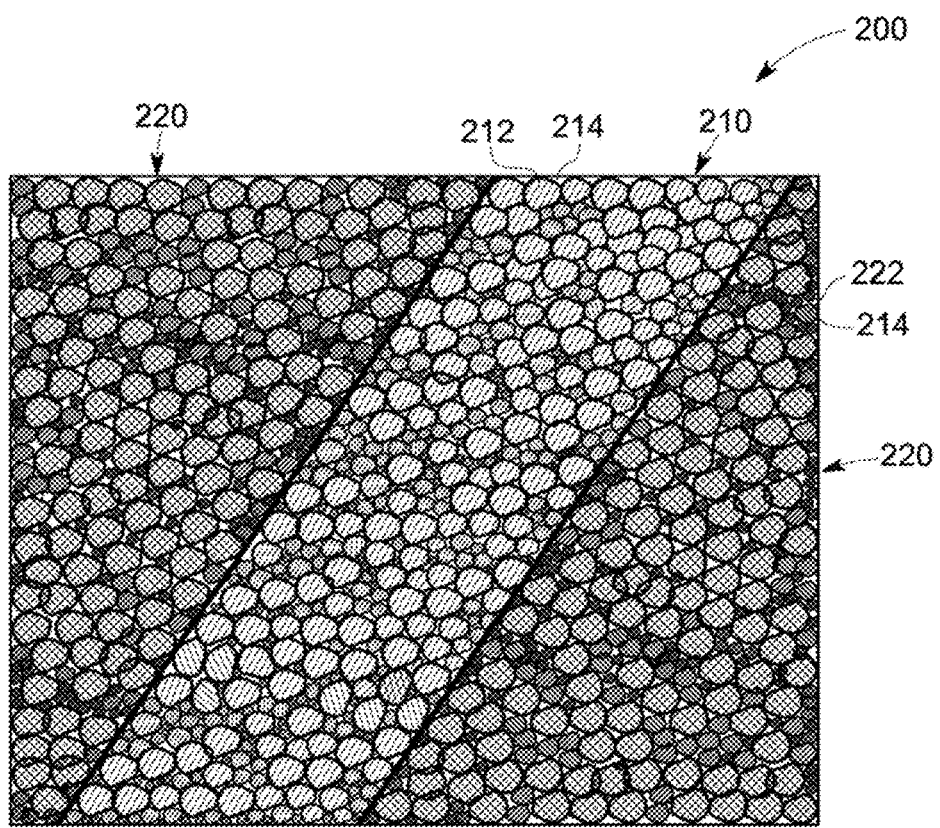
FIG. 2 illustrates a cross-sectional view of the magnetic component of FIG. 1, having a particular arrangement of the electrically insulating material in the unitary structure, according to some aspects of the present specification.

In some embodiments, the electrically insulating material may be an electrically insulating solid material. The electrically insulating solid material may be dispersed along with the metallic material in the magnetic component 100. In some embodiments, only the magnetic region includes the electrically insulating phase 114, however in some other embodiments, both the magnetic region and the non-magnetic region include the electrically insulating phase 114 having the electrically insulating solid material, as shown, for example, in FIG. 2. In FIG. 2, magnetic component 200 includes a magnetic region 210 and a non-magnetic region 220. The magnetic region 210 includes a magnetic phase 212 and an electrically insulating phase 214. At least a portion of the magnetic region 210 is disposed between portions of the non-magnetic region 220. The non-magnetic region 220 includes a non-magnetic phase 222 and the electrically insulating phase 214. The electrically insulating phase 214 includes an electrically insulating material. In some embodiments, the electrically insulating material is disposed in at least some particle boundaries of the metallic material. In some embodiments, an amount of an electrically insulating solid material in the magnetic region 210 may be greater than an amount of electrically insulating solid material in the non-magnetic region 220. In an example embodiment, the unitary structure of the magnetic region and the non-magnetic region as presented in FIG. 1 or 2 may be used in a transverse flux electric machine.

Although not illustrated in FIGS. 1 and 2, in some embodiments, the magnetic component 100 may further include a matrix material, in addition to the metallic material and the electrically insulating material. In some embodiments, the matrix material may be a polymer that is different from the electrically insulating material. In certain embodiments, the matrix material is a cured form of a binder that is used to bond the metallic material during preparation of the magnetic component 100. In some embodiments, the metallic material and the electrically insulating material are bonded by the matrix material. In an example embodiment, the magnetic region 110 of the magnetic component 100 includes an iron-chromium manganese alloy as the metallic material, a silicone as the electrically insulating material in a matrix of an epoxy or a polyurethane.

Figure 3:
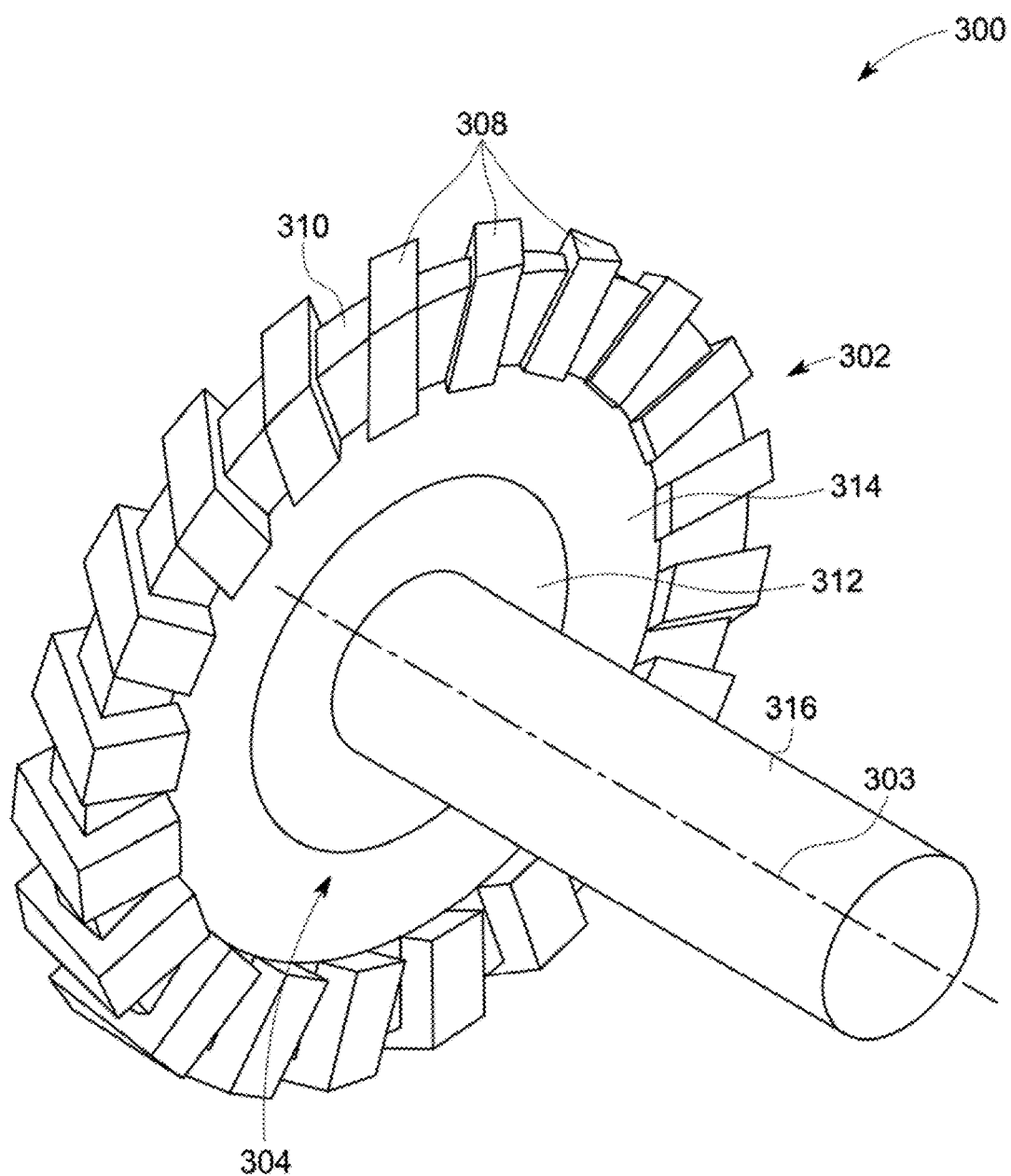
FIG. 3 is a schematic view of one phase of a transverse-flux electric machine featuring a ring-coil surrounded by an additively manufactured stator assembly, according to some aspects of the present specification.

In some embodiments, a transverse flux electric machine is disclosed. The transverse flux electric machine includes a magnetic component in the form of a stator pole, configured to transfer magnetic flux in an axially skewed direction around a stator coil. FIG. 3 illustrates a diagrammatical representation of a single phase of an additively manufactured transverse flux machine 300. The transverse flux machine 300 includes a stator 302 operatively coupled to a rotor 304. The stator 302 includes a plurality of stator poles 308, and a stator coil 310. The stator poles 308 are operatively coupled to the stator coil 310, and each stator pole 308 surrounds at least a portion of the stator coil 310. In certain embodiments, the rotor 304 may include a rotor yoke 312, an array 314 of permanent magnets (not shown in FIG. 3), and a rotor shaft 316 along an axis 303. The stator pole 308 has a unitary structure and includes a magnetic region and a non-magnetic region (not shown in FIG. 3). A shape of the magnetic region, the non-magnetic region, or both the magnetic and non-magnetic regions may be similar or different in different stator poles 308. The magnetic region includes a magnetic phase and an electrically insulating phase, and the non-magnetic region includes a non-magnetic phase, as disclosed earlier with respect to FIG. 1 or FIG. 2. The magnetic phase includes a metallic material and the non-magnetic phase includes a nitrogenated metallic material that is formed by controlled nitrogenation of the metallic material. The structure of the magnetic region and the non-magnetic region and working of a stator pole is described in greater detail with respect to FIGS. 4 and 5.

Figure 4:
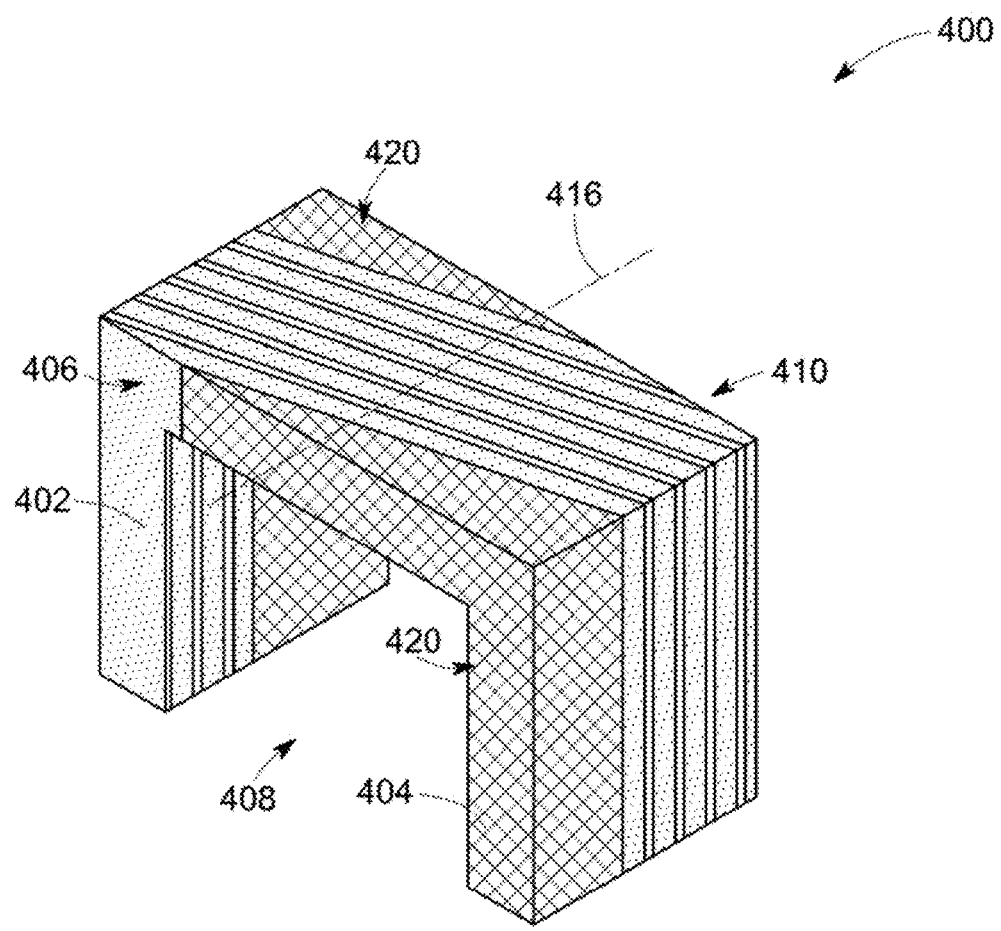
FIG. 4 illustrates a cross-sectional view of a part of an additively manufactured stator assembly of FIG. 3, having a determined arrangement of a magnetic region and a non-magnetic region in the unitary structure, according to some aspects of the present specification.

FIG. 4 is a blown-up schematic view of an additively manufactured stator pole 400, of a transverse flux machine, such as the transverse flux machine 300 of FIG. 3. The stator pole 400 includes a pair of legs 402, 404 and a connecting segment 406 connecting the legs 402 and 404 and an opening 408. In particular, the opening 408 is disposed between the pairs of legs 402, 404 of the stator pole 400. The opening 408 is configured to receive at least a portion of a stator coil (not shown in FIG. 4). Accordingly, a shape and dimensions of the opening 408 correspond to a shape and dimensions of the stator coil. Furthermore, the stator pole 400 includes at least one of a magnetic region 410 and a non-magnetic region 420. The magnetic region 410 is not symmetrical about a center line 416 of the connection segments 406. In particular, portions 410 and 420 of the stator pole 400 disposed on either side of the center line 416 are not mirror images of one another. In particular, the magnetic region 410 in one side of the center line 416 is not aligned with respect to the magnetic region 410 in the other side of the center line 416.

Figure 5:
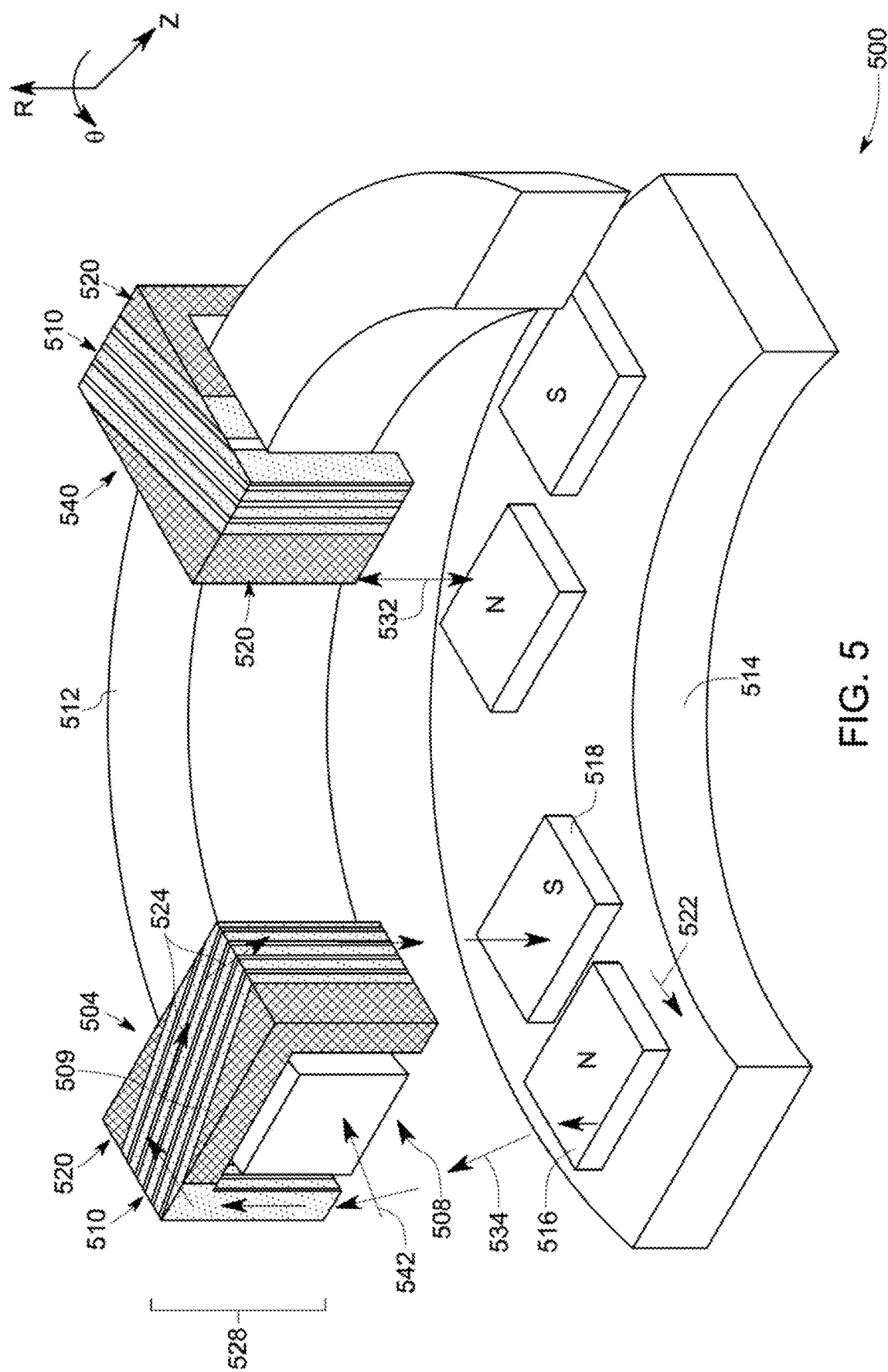
FIG. 5 is a diagrammatical representation of an example portion of the transverse flux machine, according to some aspects of the present specification.

FIG. 5 is a diagrammatical representation of an example portion of the transverse flux machine, according to aspects of the present specification. In particular. FIG. 5 represents a portion of a core 500 of the transverse flux machine. Typically, magnetically conducting portion of the transverse flux machine is referred to as a core. In FIG. 5, the stator poles 308 and the array 314 of permanent magnets form a core of the transverse flux machine 300. The illustrated portion of the core 500 includes stator poles 504 and 540. In some embodiments, the stator poles 504 and 540 are planar stator poles. In accordance with aspects of the present specification, each of the stator poles 504 and 540 includes a unitary structure having magnetic region 510 and non-magnetic region 520. A boundary between the magnetic and non-magnetic regions 510 and 520 is represented by reference numeral 509. In the example of FIG. 5, the magnetic region 510 is defined by a value of relative permeability that is greater than a threshold value. Further, a value of relative permeability of the non-magnetic region 520 is equal to or lower than the threshold value. The magnetic region 510 forms magnetically conducting portion of the stator poles 504 and 540.

In the example of FIG. 5, the stator poles 504, 540 have a C-shaped structure. Further, an opening 508 is defined in the stator poles 504, 540. The opening 508 is configured to receive a stator coil 512. The stator coil 512 is configured to energize the stator poles 504 and 540. In some embodiments, the stator coil 512 may be made of materials, such as copper, aluminum, or the like. The stator coil 512 includes a ring like structure. A combination of the stator poles 504, 540 and the stator coil 512 forms a stator 528. Although the example of FIG. 5 depicts only two stator poles 504, 540, multiple stator poles may be disposed substantially equidistant from each other along the stator coil 512. The magnetic region 510 of the stator poles 504 and 540 together with magnetic region of other stator poles of the core 500 define a 3D magnetic circuit 534 of the core 500.

The core 500 includes an array 514 of permanent magnets. North and south poles of each permanent magnet of the array 514 are disposed in individual rows. Further, the north and south poles of each permanent magnet of the array 514 are axially and tangentially shifted with respect to north and south poles of other permanent magnets of the array 514. The term 'north pole,' as used herein, may be used to refer to a pole, where the direction of magnetization of the pole points outwards from the magnet's surface. An opposite end of the north pole 516 is referred to as a south pole 518. The array 514 of permanent magnets forms a part of a rotor of the core 500.

Arrow 542 represents the direction of rotation of the rotor. Further, arrow 522 represents the direction of current flow through the stator coil 512 at a particular instant in time. Since the stator coil 512 is a ring like structure, the current flowing through the stator coil 512 follows a substantially circular path. Accordingly, when the current flows through the stator coil 512 in the direction shown by arrow 542, a magnetic flux 524 is generated in a clockwise direction around the stator coil 512. In particular, the magnetic flux 524 flows through the stator pole 504. Although in the example of FIG. 5, two stator poles 504, 540 are represented, for ease of explanation, the flow of magnetic flux 524 is explained with respect to only one stator pole, stator pole 504.

As noted hereinabove, the magnetic region 510 of the stator pole 504 has a value of relative permeability greater than a threshold value and the non-magnetic region 520 of the stator pole 504 has a value of relative permeability equal to or lower than the threshold value. In one example, the threshold value is 300. Furthermore, it may be noted that the relative permeability of air is equal to 1. Due to higher relative permeability of the magnetic region 510 of the stator pole 504, in operation, the magnetic flux 524 flows through the magnetic region 510 and not through the non-magnetic region 520 or air. The magnetic region 510 of the stator pole 504 provides a 3D space for the magnetic flux 524 to flow. In operation, the magnetic flux 524 flows towards the inner radius of the stator 528. At the inner radius, the magnetic flux 524 flows through one end of the stator pole 504, crosses airgap 532, and flows into the array 514 of permanent magnets. In particular, the magnetic flux 524 flows into the south pole 518 of the array 514 of permanent magnets along R-axis. Further, the magnetic flux 524 flows through the rotor (for example, through the iron of the rotor) in a θ-z plane, and emerges from the north pole 516 of the array 514 of permanent magnets. While re-entering the stator pole 504 at another end, the magnetic flux 524 again crosses the airgap 532 to another end of the same stator pole 504 or a different stator pole 540. In some embodiments, the magnetic flux 524 crosses the airgap 532 to the magnetically conducting portion 510 at another end of the stator pole 504.

Typically, in a transverse flux electric machine, the magnetic flux 524 flowing through magnetic region 510 would generate eddy current that would increase an energy loss from the magnetic core. The unitary structured stator poles 504 and 540 of the core of the transverse flux electric machine in the embodiments presented herein include an electrically insulating phase along with the magnetic phase in the magnetic region 510. The electrically insulating phase present in the magnetic region 510 limits the eddy current generation in the magnetic region 510, and thereby prevents or at least reduces the energy loss due to eddy current. Further, by using an additive manufacturing technique, the magnetic features may be aligned parallel to the magnetic flux 524 path and thereby minimize the magnetic flux leakage from the magnetic region 510. In certain embodiments, the unitary structure of the transverse flux electric machine includes the electrically insulating phase in the non-magnetic region 520, in addition to in the magnetic region 510. The presence of the electrically insulating phase in the non-magnetic region 520 prevents further conduction of the eddy current from the magnetic region 510 and thereby helps in further reduction of the energy loss from the machine.

In some embodiments, the non-magnetic phase includes a nitrogen content that is greater than 0.1 weight percentage of the nitrogenated metallic material. The nitrogen content of the non-magnetic phase may be a constant across the non-magnetic region 120, or may vary depending on a depth of the location from a nitrogen diffusing surface of the magnetic component. In some embodiments, the electrically insulating phase includes air, an inert gas, an electrically insulating solid material, or any combinations thereof. In some embodiments, the air, inert gas, or a combination of the air and inert gas is disposed in a plane parallel to the magnetic flux in the magnetic phase during an operation of the transverse flux electric machine. In some embodiments, the electrically insulating solid material is disposed in particle boundaries of the metallic material. In some embodiments, both the magnetic region and the non-magnetic region include the electrically insulating phase having the electrically insulating solid material.

In some embodiments, a method of making a magnetic component is disclosed. The method includes performing an additive manufacturing technique using a metallic material to form the magnetic component having a unitary structure. The unitary structure includes the metallic material in a magnetic state. In some embodiments, the unitary structure is primarily built using the metallic material such that greater than 90% of the unitary structure is made of the metallic material. The method further includes performing a controlled nitrogenation of a selected region of the unitary structure to transform the metallic material in the selected region into a nitrogenated metallic material, such that, in the final structure, the unitary structure includes a magnetic region that has a magnetic phase and an electrically insulating phase and a non-magnetic region includes a non-magnetic phase. The magnetic phase includes the metallic material used for forming the unitary structure and the non-magnetic phase includes the nitrogenated metallic material obtained by nitrogenating the metallic material used for forming the unitary structure. The controlled nitrogenation of the selected region may be carried out in situ, during the formation of unitary structure or after the formation of the unitary structure. In some embodiments, the method of making the magnetic component includes performing an additive manufacturing technique using a metallic material and an electrically insulating material to form the magnetic component having a unitary structure formed by the metallic material and the electrically insulating material.

"Additive manufacturing" is a term used herein to describe a process which involves layer-by-layer construction or additive fabrication (as opposed to material removal as with conventional machining processes). Such processes may also be referred to as "rapid manufacturing processes". The additive manufacturing process forms net or near-net shape structures through sequentially and repeatedly depositing and joining material layers. As used herein the term "near-net shape" means that the additively manufactured structure is formed very close to the final shape of the structure, not requiring significant traditional mechanical finishing techniques, such as machining or grinding following the additive manufacturing process. Additive manufacturing systems and methods include, for example, and without limitation, vat photopolymerization, powder bed fusion, binder jetting, material jetting, sheet lamination, material extrusion, directed energy deposition and hybrid systems. These systems and methods may include, for example, and without limitation, stereolithography; digital light processing; scan, spin, and selectively photocure; continuous liquid interface production; selective laser sintering; direct metal laser sintering; selective laser melting; electron beam melting; selective beat sintering; multi-jet fusion; smooth curvatures printing; multi-jet modeling; laminated object manufacture; selective deposition lamination; ultrasonic additive manufacturing fused filament fabrication; fused deposition modeling; laser metal deposition; laser engineered net shaping; direct metal deposition; hybrid systems; and combinations of these methods and systems. These methods and systems may employ, for example, and without limitation, all forms of electromagnetic radiation, heating, sintering, melting, curing, binding, consolidating, pressing, embedding, and combinations thereof.

Additive manufacturing may be used to manufacture articles using computer aided design (CAD) models. Binder jet technique is a type of additive manufacturing technique capable of printing a metal, ceramic, or polymer part by selectively depositing a CAD-determined pattern of a binder solution (e.g., liquid glue) into a powder bed, overcoating with fresh particles, and repeating the depositing process until the part is complete. The printed part generally undergoes a curing process, which solidifies the binder solution within the powder to form a green body (e.g., as-printed, unfired) part. The green body part subsequently may undergo an optional debinding process, which is generally a heat treatment process that decomposes and removes the binder from the green body part, forming a brown (e.g., partially-fired) part. The brown body part may further undergo a sintering process to consolidate the powder and form a final (e.g., consolidated) part.

Performing the additive manufacturing technique to form the unitary structure may include fabricating a plurality of build layers having the metallic material and an electrically insulating material. In some embodiments, the plurality of build layers may be fabricated using the metallic material, an electrically insulating solid material, and a binder. The build layers may be optionally heat-treated to remove the binder and to effectively dispose the electrically insulating solid material in particle boundaries, at least in a portion of the build layers.

In some embodiments of the present specification, a binder jet process is used for making the magnetic component. The method of making the magnetic component using the binder jet process includes fabricating a first build layer having a binder and consolidated particles of the metallic material and the electrically insulating material. The method further includes fabricating a second build layer on the first build layer, the second build layer having the binder and consolidated particles of the metallic material and the electrically insulating material. In some embodiments, the consolidated particles of the metallic material and the electrically insulating material in the first or subsequent build layers are consolidated prior to, during, or after an addition of the binder in fabricating the first build layer. Depending on the required location of the electrically insulating particles in the finally prepared magnetic component, the metallic material and the electrically insulating material may be disposed in different, pre-determined patterns in two or more build layers. In some embodiments, the metallic material and the electrically insulating material are pre-mixed before forming the build layers such that the electrically insulating material is dispersed at least partially surrounding the metallic particles in the build layers. The amount of metallic materials and the electrically insulating materials may be configured to be varied at different parts of the formed magnetic component by controlling the ratio of the metallic, material to the electrically insulating material at various parts of the build layers during the formation of the magnetic component. These variation in the ratio of the metallic material and the electrically insulating material may be advantageous to control the amount of the electrically insulating material present in the magnetic region and the non-magnetic region in the magnetic component formed by the binder jet process.

The magnetic component as used herein, is usually prepared from a single metallic material along with an electrically insulating material. As an example, the material may be a composite magnetic member providing a ferromagnetic portion. The non-magnetic portion may be formed by nitriding selected regions of the ferromagnetic portion in a controlled atmosphere. When the magnetic component is made using a single metallic material along with an electrically insulating material, the negative effects of bonding a ferromagnetic portion and a non-magnetic portion are reduced by ensuring reliability, hermeticity, and the bond strength of the magnetic component.

Depending on the properties of the metallic material and the electrically insulating material, and further on the expected magnetic flux passing through the magnetic region 110, the metallic material and the electrically insulating material may be present in appropriate amount in the unitary structure. In some embodiments, a weight ratio of the metallic material to the electrically insulating material used for making the unitary structure is in a range from about 3:1 to about 50:1.

In some embodiments, the metallic material is in the form of particles having a median particle size greater than 10 micrometers and less than 50 micrometers. In some embodiments, the median particle size of the metallic material is in a range from about 15 micrometers to about 30 micrometers. In certain embodiments, the particles of the metallic material have a monomial particle size distribution throughout the unitary structure of the magnetic, component 100.

In some of the metallic materials, such as, for example ferrous alloys, the presence of carbon is known to stabilize non-magnetic austenite structure. Earlier efforts had been directed at dissolving formed carbides at selected regions of the magnetic component to stabilize non-magnetic phases at those regions of the magnetic component. In some embodiments of the present specification, a non-magnetic region of the magnetic component is formed by stabilizing a low permeability austenite structure by the addition of nitrogen, rather than carbon. Similar to carbon, nitrogen also stabilizes the austenite phase by dissolving in a ferrous alloy. Carbides as second phases are known to be undesirable for the magnetic component. Thus, in some embodiments of the present specification, the material forming the magnetic component is substantially free of carbon. In other embodiments, the composition may contain a relatively small level of carbon, which can sometimes increase the tensile strength of the magnetic region. In these embodiments, the total amount of carbon in the magnetic and non-magnetic regions must be less than about 0.05 weight %.

The non-magnetic region of the magnetic component includes nitrogen in a quantity that stabilizes the austenite phase. In some embodiments, the formed magnetic component is subjected to selective nitriding of the near-final component, without the need to substantially alter the shape and size of the formed magnetic component after nitriding. As used herein the term "selective nitriding" is the nitriding of some (required) regions of the magnetic component, without substantially altering the ferromagnetic nature of the nearby regions. The ferromagnetic nature of the nearby regions may be considered to be "substantially altered", if the average saturation magnetization of those regions is reduced by more than about 5 percent.

The selective nitriding of the magnetic component may be attained by using different methods of nitriding. A chemical, physical, or mechanical block may be provided to the regions of the magnetic component where the nitriding is not desirable to retain the magnetism. For example, a chemical composition that discourages nitrogen diffusion into the magnetic component may be used as the "nitrogen stop-off" material at some regions. A physical method of selectively introducing the nitrogen at selected regions, while making the nitrogen unavailable for the other regions, may be used. A mechanical block may be able to mechanically prevent the diffusion of the nitrogen at certain regions.

Nitriding may be carried out through a solid, liquid, gaseous, or plasma route. In some embodiments of the present specification, elevated temperature gas nitriding is used to introduce nitrogen to the part. The elevated temperatures in this technique allow for fast diffusion of nitrogen, providing a quick processing route. Alternately, plasma nitriding may be used for the nitrogen diffusion. In order to avoid nitrogen diffusion in those areas which are intended to stay ferritic (and thus magnetic). In some embodiments, a mechanical mask or stop-off material is applied to locations where nitrogen diffusion is not desirable. Thus, in this embodiment, the pre-selected regions that correspond to the regions that are supposed to remain magnetic are masked, using a mechanical method, e.g., a nitrogen stop-off material. As used herein a "nitrogen stop-off material" is a material that is capable of substantially stopping the nitrogen from entering into that region. It is not necessary that the stop-off material itself contain nitrogen. In some embodiments, performing the controlled nitrogenation of the non-magnetic region includes mechanically masking a surface of the magnetic region using a nitrogen stop-off material, and heat-treating the magnetic component in a nitrogen-rich atmosphere at a temperature greater than 900 degrees Celsius (°). Nitrogen may be diffused into the magnetic component through gas nitriding in a nitrogen-rich atmosphere, at a pressure greater than about 0.5 atmosphere, and a temperature greater than about 900° C. Generally, the diffusion of nitrogen is expected to increase with a higher heat-treatment temperature, and an increased equilibrium surface concentration of nitrogen. The increased pressure of the gases surrounding the magnetic component often leads to an increased surface concentration of nitrogen. Therefore, at a given condition in a pure nitrogen atmosphere, a higher than atmospheric pressure and a higher temperature will generally provide a faster nitriding process.

In some embodiments, a nitrogen-rich atmosphere is used. In some embodiments, the nitrogen-rich atmosphere includes more than about 90% of nitrogen. In some embodiments, nitriding is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing. In some embodiments, an ambient pressure of greater than 1 atmosphere and a temperature greater than about 900° C. is used for nitriding. In a further embodiment, the temperature of nitriding is greater than 1000° C.

Through empirical and thermodynamic calculations, the parameters of nitriding may be adjusted, and the nitrogen diffusion at different directions may be predicted for certain regions of the magnetic component, and accordingly, the mask size and shape may be altered so that the end product obtained is approximately the desired outcome of the nitriding process.

Nitriding of the magnetic component at designed conditions allows the introduction of a tailored amount of nitrogen to be diffused interstitially into the magnetic component. In some embodiments, the unmasked region includes greater than about 0.4% of nitrogen. The intermixing and the concentration of nitrogen is not only limited to the unmasked regions of the surface, but is present in both the surface portion and the interior portion of the unmasked regions of the magnetic component 100. The concentration of nitrogen in the surface portion and the interior portion need not be uniform.

Various embodiments of a magnetic component and a method of manufacturing the magnetic component are presented. In accordance with aspects of the present specification, a magnetic component having a unitary structure of the magnetic and non-magnetic regions, and further having an electrically insulating phase in the magnetic region provides structural integrity and enhanced energy conservation of the magnetic component. A transverse flux electric machine having the magnetic component may find various applications including, but not limited to, in hybrid electrical vehicles and wind turbines.

This written description uses examples to disclose the specification, including the best mode, and also to enable any person skilled in the art to practice the specification, including making and using any devices or systems and performing any incorporated methods. The patentable scope of the specification is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A magnetic component for a stator pole configured to transfer magnetic flux in an axially skewed direction around a stator coil of a transverse electric machine, said magnetic component comprising:
   a unitary structure comprising a magnetic region and a non-magnetic region, wherein
      the magnetic region comprises a magnetic phase and an electrically insulating phase, the electrically insulating phase disposed in a plane parallel to the magnetic flux in the magnetic phase during an operation of the transverse electric machine; and
      the non-magnetic region comprises a non-magnetic phase, and wherein the magnetic phase comprises a metallic material and the non-magnetic phase comprises a nitrogenated metallic material formed by controlled nitrogenation of the metallic material.

2. The magnetic component of claim 1, wherein the non-magnetic phase comprises a nitrogen content that is greater than 0.1 weight percentage of the nitrogenated metallic material.

3. The magnetic component of claim 1, wherein the nitrogenated metallic material is formed by in situ transformation of the metallic material from a magnetic state to a non-magnetic state through the controlled nitrogenation.

4. The magnetic component of claim 1, wherein the electrically insulating phase comprises air, an inert gas, an electrically insulating solid material, or any combinations thereof.

5. The magnetic component of claim 4, wherein the air, inert gas, or a combination of the air and the inert gas is disposed in a gap in the magnetic phase.

6. The magnetic component of claim 4, wherein the electrically insulating solid material is disposed in particle boundaries of the metallic material.

7. The magnetic component of claim 4, wherein both the magnetic region and the non-magnetic region comprise the electrically insulating phase, wherein the electrical insulating phase comprises the electrically insulating solid material.

8. The magnetic component of claim 1, wherein magnetic and non-magnetic regions are dispersed in the magnetic component such that the magnetic and non-magnetic regions are adjacently disposed to one another in the unitary structure of the magnetic component.

9. The magnetic component of claim 8, wherein the magnetic region is in physical contact with other magnetic regions, non-magnetic regions, or both.

10. A transverse electric machine, comprising:
   a stator pole configured to transfer magnetic flux in an axially skewed direction around a stator coil, wherein the stator pole has a unitary structure comprising a magnetic region and a non-magnetic region, and wherein
      the magnetic region comprises a magnetic phase and an electrically insulating phase, the electrically insulating phase disposed in a plane parallel to the magnetic flux in the magnetic phase during an operation of the transverse electric machine; and
      the non-magnetic region comprises a non-magnetic phase; and wherein the magnetic phase comprises a metallic material and the non-magnetic phase comprises a nitrogenated metallic material formed by controlled nitrogenation of the metallic material.

11. The transverse electric machine of claim 10, wherein the non-magnetic phase comprises a nitrogen content that is greater than 0.1 weight percentage of the nitrogenated metallic material.

12. The transverse electric machine of claim 10, wherein the nitrogenated metallic material is formed by in situ transformation of the metallic material from a magnetic state to a non-magnetic state through the controlled nitrogenation.

13. The transverse electric machine of claim 10, wherein the electrically insulating phase comprises air, an inert gas, an electrically insulating solid material, or any combinations thereof.

14. The transverse electric machine of claim 13, wherein the air, inert gas, or a combination of the air and the inert gas is disposed in a plane parallel to the magnetic flux in the magnetic phase during an operation of the transverse electric machine.

15. The transverse electric machine of claim 13, wherein the electrically insulating solid material is disposed in particle boundaries of the metallic material.

16. The transverse electric machine of claim 10, wherein both the magnetic region and the non-magnetic region comprise the electrically insulating phase, wherein the electrical insulating phase comprises the electrically insulating solid material.

17. The transverse electric machine of claim 10, wherein magnetic and non-magnetic regions are dispersed in the stator pole such that the magnetic and non-magnetic regions are adjacently disposed to one another in the unitary structure of the stator pole.

* * * * *